(No Model.)

C. S. BRADLEY.
ELECTRIC CONDENSER.

No. 543,978. Patented Aug. 6, 1895.

WITNESSES:
C. E. Aoshley
I. H. W. Lloyd

INVENTOR:
Charles S. Bradley
By his Attorney

United States Patent Office.

CHARLES S. BRADLEY, OF AVON, NEW YORK.

ELECTRIC CONDENSER.

SPECIFICATION forming part of Letters Patent No. 543,978, dated August 6, 1895.

Application filed May 11, 1895. Serial No. 548,889. (No model.)

*To all whom it may concern:*

Be it known that I, CHARLES S. BRADLEY, a citizen of the United States, residing at Avon, in the county of Livingston and State of New York, have invented certain new and useful Improvements in Electric Condensers, of which the following is a specification.

The object of this invention is to produce a compact condenser for use in polyphase alternating-current circuits which may be handled as a unitary device.

A further object is to cheapen the construction of the condenser by giving it an equal capacity with fewer plates than would be required in a set of ordinary condensers when separate ones are placed between the several pairs of polyphase mains or leads.

In carrying out my invention I place side by side, as in a pile, metal sheets, plates, or surfaces, with any suitable intervening dielectric, and connect in multiple a set of plates for each lead. In a triphase-circuit, for example, there are three sets, the first, fourth, seventh, &c., plates; the second, fifth, eighth, &c.; and the third, sixth, ninth, &c., leading, respectively, to terminals adapted for connection with the several leads of a triphase-circuit.

The several features of novelty of the invention will be more particularly hereinafter described, and will be definitely indicated in the claims appended to this specification.

Figure 1:
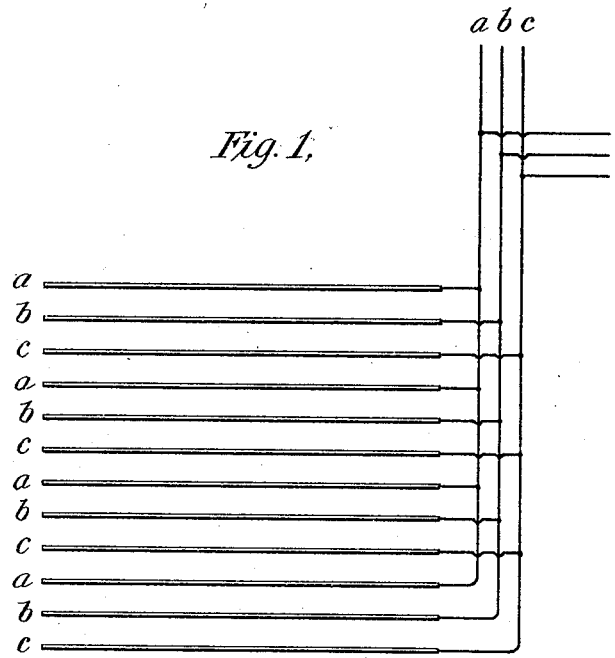
Figure 2:
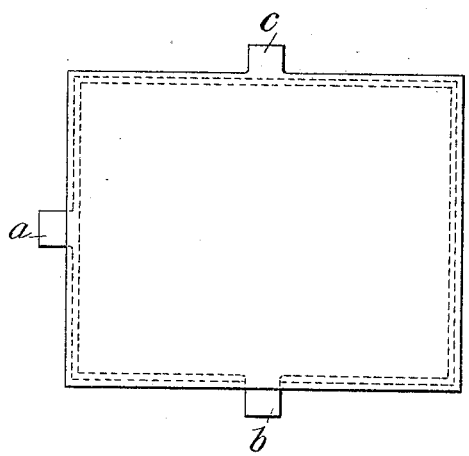

In the accompanying drawings, which illustrate my invention, Figure 1 is a diagram illustrating a condenser coupled with a triphase-circuit in accordance with my invention, and Fig. 2 is a diagram showing a detail of construction.

A series of plates or metallic surfaces are placed in close juxtaposition, as by piling them upon one another, with a solid intervening dielectric, or by supporting them side by side with spacing-strips, so as to leave open spaces for a liquid or gaseous dielectric in ways familiar to those skilled in the art. The plates are in number a multiple of the number of leads in the supply or distribution circuit. For example, in a triphase-circuit, as exemplified in the drawings, the number of plates is a multiple of three, and the plates are connected in order with the three mains. The first, fourth, seventh, &c., are connected with one lead, as $a$; the second, fifth, eighth, &c., with $b$, and the third, sixth, ninth, twelfth, &c., with $c$. Each plate is provided, as usual, with an ear of metal projecting from the pile, the ears for the three sets being formed so that when assembled they will lie in the same plane to facilitate making connection with a terminal or binding post, as seen at $a$ $b$ $c$, Fig. 2. With this organization a great saving of material is effected, resulting in a great increase of capacity, bulk for bulk, as compared with a set of separate condensers. For example, in the organization illustrated there are four effective sets of plates, although but twelve plates are used in all. With a separate condenser between each pair of leads, which is the common practice, it is evident that to get the same number of sets twenty-four plates must needs be employed, eight in each condenser. Moreover, the condenser is rendered far more compact and is greatly cheapened in construction, since but one housing or casing is required, where three are necessary with the common construction. It will be understood, also, that the condenser by reason of its small comparative bulk may be more easily stored in the base of a motor, for example, with which it is to co-operate.

The several current-phases are distributed among the plates in the same manner as they are among the line-wires which carry the currents.

Having thus described my invention, what I claim as new, and desire to secure by Letters Patent, is—

1. A polyphase condenser comprising a series of conductive plates or surfaces connected in groups with polyphase terminals, the members of said groups being interleaved with one another.

2. A polyphase condenser comprising a series of conductive surfaces electrically connected respectively in consecutive order with three or more terminals.

3. A polyphase condenser comprising a series of conductive plates or surfaces separated by a suitable dielectric and provided with terminals for connection with a polyphase circuit, said terminals being electrically connected respectively in consecutive order with the several plates.

In testimony whereof I have hereunto subscribed my name this 15th day of April, A. D. 1895.

CHARLES S. BRADLEY.

Witnesses:
 ROBT. H. READ,
 GEORGE A. ADAMS.